United States Patent Office 3,832,320
Patented Aug. 27, 1974

---

3,832,320
MODIFIED POLYBENZOTHIAZOLE-BASED ADHESIVE
Theodore J. Aponyi and Edward A. Arvay, Dayton, Ohio, assignors to the United States of America as represented by the Secretary of the United States Air Force
No Drawing. Filed Nov. 7, 1972, Ser. No. 304,585
Int. Cl. C08g 20/32, 33/02
U.S. Cl. 260—32.6 NT     3 Claims

ABSTRACT OF THE DISCLOSURE

An adhesive is provided that consists essentially of (1) a polybenzothiazole modified by reaction with 4-aminophthalimide, (2) aluminum and (3) zinc oxide. The adhesive is particularly useful in bonding structural members, e.g., those fabricated from stainless steel or titanium, that are subjected to high temperatures as in the operation of high performance aircraft.

FIELD OF THE INVENTION

This invention relates to an adhesive composition based upon a modified polybenzothiazole. In one aspect the invention relates to a method for preparing the modified polybenzothiazole adhesive. In another aspect it relates to composites or laminates and metal structures which are fabricated with the adhesive as the bonding agent.

BACKGROUND OF THE INVENTION

The prior art discloses a variety of polymeric materials that are stated to be useful as adhesives. Representative of these materials are epoxy resins, polyimides, and polybenzimidazoles. While the prior art resins or polymers are suitable for many applications, as a general proposition they cannot be satisfactorily employed to bond materials that are to be subjected to elevated temperatures for an extended period of time. For example, polyimide composites and bonded joints undergo a sharp drop in strength properties upon exposure to temperatures of 500° F. and above for short periods of time (10 to 30 minutes). Polybenzimidazole adhesives are not subject to an abrupt decrease in mechanical properties after a short exposure to high temperatures, but these adhesives possess poor oxidative stability, degrading rapidly after a few hours subjection to a temperature of about 700° F.

It is an object of this invention, therefore, to provide an adhesive composition which will function as a bonding agent for forming composites and metal joints possessing outstanding strength properties after exposure to elevated temperatures, e.g., from 600 to 900° F. and higher, for extended periods of time.

Another object of the invention is to provide a method for formulating a modified polybenzothiazole-based adhesive.

A further object of the invention is to provide composites and bonded metals having good mechanical properties after exposure to elevated temperatures for extended periods of time.

Other objects and advantages of the invention will become apparent to those skilled in the art upon consideration of the accompanying disclosure.

SUMMARY OF THE INVENTION

The present invention broadly resides in an adhesive composition which comprises (1) a polybenzothiazole modified by reaction with 4-aminophthalimide and (2) zinc oxide. In a more specific embodiment, the adhesive composition consists essentially of (1) a modified polybenzothiazole prepared by reacting mixed toluidines, elemental sulfur and 4-aminophthalimide, (2) aluminum powder, and (3) zinc oxide. The amount of zinc oxide contained in the composition is usually in the range of about 10 to 20 parts by weight per 100 parts by weight of the modified polybenzothiazole. When included in the composition, the amount of aluminum powder generally ranges from about 50 to 100 parts by weight per 100 parts by weight of the modified polybenzothiazole.

The modified polybenzothiazole is prepared by reacting mixed toluidines with elemental sulfur at a temperature sufficient to melt the reactants. As a result of the reaction, polybenzothiazole is formed that is then modified by reaction with 4-aminophthalimide. The amounts of mixed toluidines and elemental sulfur that are reacted are generally in the respective ranges of about 2 to 4 mols and about 8 to 15 gram atoms for each mol of 4-aminophthalimide. A modified polybenzothiazole prepared by reacting 3 mols of mixed toluidines, 13 gram atoms of sulfur and 1 mol of 4-aminophthalimide has been found to be particularly effective. In a preferred procedure, a mixture of the mixed toluidines and sulfur are heated under an inert atmosphere at a temperature in the range of about 250 to 450° F. for a period of about 12 to 20 hours. Examples of gases that can be used to provide an inert atmosphere include nitrogen, helium, argon, hydrogen sulfide, and the like. During the reaction period the 4-aminophthalimide is added to the reaction mixture and reacts with the polybenzothiazole that has formed. It is often preferred to add the 4-aminophthalimide in increments subsequent to commencement of the reaction, e.g., from about 1 to 5 hours after the reaction mixture reaches the temperature of reaction. The addition of the 4-aminophthalimide is generally completed in about 2 to 5 hours. While the procedure described has been found to be the most desirable one, it is to be understood that the 4-aminophthalimide can be added continuously or at one time during the reaction period. In any event the addition should be completed from about 2 to 5 hours prior to the end of the 12 to 20 hour reaction period.

In forming the polybenzothiazole, the condensation reaction that occurs between the mixed toluidines and elemental sulfur can be represented by the following equation:

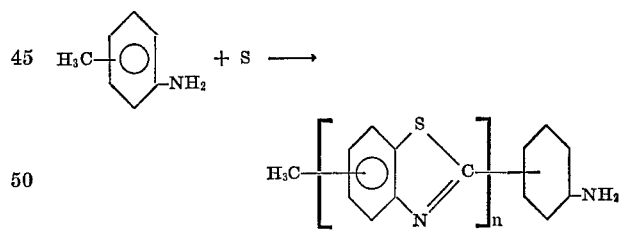

wherein $n$ is equal to 1 to 3, inclusive. As a result of the addition of 4-aminophthalimide, the structure of the polybenzothiazole is altered. Thus, the modified polymer is believed to contain polymer molecules having the following formula:

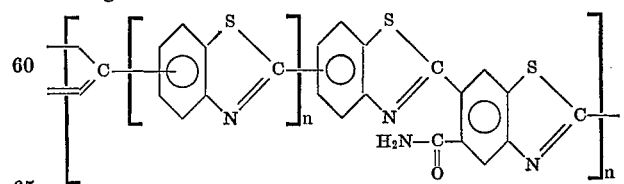

wherein $n$ is equal to at least one and $n'$ is equal to $n$ plus at least one. While the reaction product obtained is believed to be dominated by a polymer having the foregoing structure, it has not been possible to determine by analytical methods the exact composition of the modified polybenzothiazole. The fact that the modified polybenzothiazole can be defined only by its method of preparation can be attributed to several factors such as possible crosslinking resulting from the condensation of two —CONH₂ groups or polymer growth proceeding from the thiooxidation of the terminal —CH₃ and —NH₂ groups.

The modified polybenzothiazole that is obtained is in the form of a brown resin having a melting point of about 275° F. The polymer is soluble in aprotic solvents such as dimethylacetamide, dimethylformamide, dimethylsulfoxide, and the like.

The adhesive composition is prepared by dissolving the modified polybenzothiazole in an aprotic solvent. It is usually preferred to utilize dimethylacetamide as the solvent. After dissolution of the polymer, zinc oxide is added to the solution. To ensure that all insoluble matter is in the form of fine particles, the usual practice is then to subject the solution to ball milling or to homogenization in a high speed mixer. There is thereby obtained a suspension of finely divided zinc oxide in the polymer solution. Zinc oxide is a necessary component of the adhesive formulation. Its presence as an additive to the modified polymer results in a significant improvement in oxidative stability, thereby eliminating the necessity of including conventional oxidation inhibitors such as arsenic thioarsenate. Furthermore, inclusion of zinc oxide in the composition results in an increase in the initial strength properties of composites and their subsequent retention when the adhesive is utilized in composite fabrication.

It is within the scope of the invention to include aluminum powder in the adhesive composition. The finely divided aluminum functions to reduce the coefficient of thermal expansion of the modified polybenzothiazole. The aluminum powder is preferably added to the polymer solution subsequent to addition of the zinc oxide. Thereafter, it has been found to be convenient to homogenize the mixture in a high speed blender.

The amounts of the several components that are present in the adhesive formulation can vary within rather broad limits. However, the amounts generally fall within the ranges shown in the following listing:

| Component: | Parts by weight |
| --- | --- |
| Modified polybenzothiazole | 100 |
| Zinc oxide | 10–20 |
| Aluminum | 0–100 |
| Solvent | 100–200 |

Composites or laminates are fabricated by impregnating reinforcing fibers, yarns or fabrics with an adhesive formulation as described above. Examples of suitable reinforcing materials include glass, quartz, carbon and graphite fibers and yarns as well as fabrics woven therefrom. Impregnation of the reinforcing material can be readily accomplished by conventional techniques such as by the dip tank method. After impregnation the prepreg is dried, thereby removing substantially all of the solvent and providing a tack-free, prepregged material. The drying step can be conveniently conducted in a circulating air oven at a temperature and for a time sufficient to evaporate the solvent, e.g., at a temperature ranging from about 100 to 150° F. for a period of about 15 minutes to one hour.

After the drying step, the prepreg is precured or B-staged by heating, e.g., in a forced draft oven, at a temperature ranging from about 150 to 310° F. for a period of about 1 to 3 hours. The B-staged material is now cured by heating it under pressure at an elevated temperature. For example, in fabricating a laminate, a plurality of plies of B-staged fabric, which have been cut to a desired size, are stacked and placed in a press or mold heated to a temperature in the range of about 450 to 650° F. wherein they are subjected to a pressure of from about 150 to 300 p.s.i. for a period of from about 1 to 3 hours. The resulting laminate is allowed to cool to room temperature while under pressure and then removed from the press or mold. After trimming the edges of the laminate so as to provide a smooth, uniform product, it is then postcured by heating in the absence of oxygen up to a temperature of about 850° F. over a period of from about 24 to 72 hours. The heating can be conducted in a furnace in an inert atmosphere, or the laminate can be heated while wrapped in aluminum foil and covered with lamp black to prevent contact with oxygen. In a preferred procedure the laminate is heated to about 850° F. in accordance with a heating schedule. The following is a listing of a preferred time-temperature schedule for the postcuring operation:

| Time, hours: | Temperature, ° F. |
| --- | --- |
| 15–24 | 350–550 |
| 15–24 | 550–700 |
| 2–4 | 700–750 |
| 2–4 | 750–850 |

The foregoing discussion has been concerned with the use of the adhesive composition in fabricating composites or laminates. When utilized to bond metals to one another, a similar procedure is followed in that a B-staged reinforcing fabric, which can be termed an adhesive tape, is initially prepared. The metals to be joined, often in the form of panels, are then thoroughly cleaned. The cleaning of the metals can be conveniently accomplished by washing with an alcohol solution, then degreasing by contact with trichloroethylene vapor, and finally rinsing with water. After drying the metals, they are etched by immersing in an acid bath and then washed with water and dried. The surfaces of the metals to be bonded are next primed by the adhesive formulation which for this purpose is in the form of a paste. The B-staged tape is then placed between the primed metal surfaces which have been previously heated to remove solvent. Thereafter, the assembly is placed between the platens of a hydraulically operated press. Before insertion of the assembly, the platens of the press are preheated to a cure temperature ranging from about 550 to 650° F. The assembly is maintained at a temperature in this range for a period of about 1 to 3 hours while under a pressure between about 50 and 100 p.s.i.. At the end of this heating period, the platens are allowed to cool to a temperature ranging from about 250 to 350° F., and the assembly is removed from the press. After cooling to room temperature, the bonded metals are heated to an elevated temperature in an inert atmosphere in order to postcure the adhesive composition. It is preferred to carry out the postcuring operation by heating the assembly to about 850° F. over a period of 10 to 24 hours. The following is a heating cycle that has been found to be effective for obtaining a strong bonded joint:

Room temperature to 400° F. in 2–6 hours.
400° F. to 600° F. in 2–6 hours.
600 to 850° F. in 6–12 hours.

A more complete understanding of the invention can be obtained by referring to the following illustrative examples which are not intended, however, to be unduly limitative of the invention.

EXAMPLE I

A series of laminates was prepared in which plies of glass cloth were bonded with the adhesive composition of this invention.

The modified polybenzothiazole contained in the composition was prepared by charging 150 grams (1.4 mole) of mixed toluidines (60% ortho, 37% para and 3% meta on a weight basis) and 195 grams (6.1 gram atoms) of sulfur to a two liter flask. After flushing with nitrogen, the flask containing the reaction mixture was heated to 350° F. The reaction temperature was increased from 350° F. to 420° F. over a period of 13 hours. During the reaction period a total of 79.6 grams (0.49 mole) of 4-aminophthalimide was added in five equal portions at one half hour intervals. The reaction mixture was maintained under an atmosphere of nitrogen during the reaction period. A dark brown resin having a melting point of 275° F. was recovered in the amount of 328 grams.

Utilizing the modified polymer prepared as described above, a formulation having the following composition was prepared:

| Component: | Parts by weight |
|---|---|
| Modified polymer | 100.0 |
| Zinc oxide | 15.6 |
| Dimethylacetamide | 150.0 |

The formulation was prepared by dissolving the modified polymer in the dimethylacetamide and then adding the zinc oxide. The solution containing zinc oxide was then ball milled in order to break the insoluble material into fine particles. A solution of modified polymer with finely divided zinc oxide particles in suspension was thereby obtained.

Glass cloth was impregnated with the solution containing zinc oxide by a conventional dip tank technique. Following impregnation the prepreg was dried in a circulating air oven for 30 minutes at 150° F. After the drying step, the prepreg was tack-free. The dried prepreg was then precured in a forced draft oven for 15 minutes at each of the following temperatures: 200° F., 258° F., 280° F. and 310° F.

Plies were cut to size from the B-staged cloth, and stacks of twelve plies each were formed. Each stack was placed in a press preheated to 500° F. after which a pressure of 200 p.s.i. was applied. During the initial stages of the cure, the pressure was released for 20 seconds out of every minute to facilitate the evolution of volatiles. The platen temperature was raised to 600° F. and held at that temperature for one hour. Thereafter, each laminate was cooled to room temperature while under pressure.

After each laminate was cured, its edges were trimmed. Each laminate was then postcured by heating in an oven in accordance with the following schedule:

22 hours from 350° F. to 550° F.
24 hours from 550° F. to 700° F.
3 hours from 700° F. to 750° F.
3 hours from 750° F. to 850° F.

During the postcure the laminates were wrapped in aluminum foil and covered with lamp black to prevent contact with air. The laminates each consisted of 21.5 weight percent modified polymer and 4.0 weight percent zinc oxide and had a specific gravity of 2.0.

Laminates were heat aged for various time intervals at temperatures ranging from 600 to 800° F. After each specimen was heat aged, it was tested to determine certain of its physical properties. The tests were performed in accordance with Federal Test Method Standard No. 406, "Plastics: Method of Testing," Method 1031. The results of the tests are shown below in Table I.

TABLE I

| Test conditions, °F. | Flexural strength, p.s.i. | Modulus of elasticity, p.s.i. ×10⁻⁶ | Weight loss, percent |
|---|---|---|---|
| Room temperature (RT) | 60,000 | 3.65 | |
| RT after 2 hours boiling in water | 57,100 | 3.55 | |
| 600° after ½ hour at 600° | 52,000 | 3.10 | 0.3 |
| 600° after 192 hours at 600° | 42,000 | 3.00 | 1.0 |
| 600° after 300 hours at 600° | 32,500 | 2.75 | 2.0 |
| 700° after ½ hour at 700° | 50,000 | 3.00 | 0.5 |
| 700° after 48 hours at 700° | 28,300 | 2.51 | 2.4 |
| 800° after 6 hours at 800° | 30,700 | 2.71 | 4.1 |

From the data in the foregoing table, it is seen that the laminates exhibited excellent retention of physical properties after aging for 300 hours at 600° F. Furthermore, an outstanding retention of strength properties was obtained after the 800° F. exposure. These results are particularly significant since they show that the laminates bonded with the adhesive composition of this invention do not undergo the drastic loss of properties after short time exposures to elevated temperatures as is characteristic of polyimide-based adhesives.

EXAMPLE II

A series of runs was conducted in which stainless steel panels were bonded to one another with the adhesive composition of this invention. Control runs were also carried out in which arsenic thioarsenate, a conventional antioxidant, was included in the composition of the invention and in which commercial adhesives were used to bond panels.

Employing the modified polybenzothiazole prepared as described in Example I, formulations having the following compositions were prepared.

| | Parts by weight of— | |
|---|---|---|
| Component | A | B |
| Modified polymer | 100 | 100 |
| Zinc oxide | 17.6 | 17.6 |
| Aluminum | 100 | 100 |
| AsAsS₄ | 0 | 10 |
| Dimethylacetamide | 100 | 100 |

The formulations were prepared by dissolving the modified polymer in the dimethylacetamide. After being pulverized, if required, the other components were added separately to the solution. After each addition the mixture was homogenized in a high speed blender.

Glass fabrics were impregnated with each of the adhesive formulations, using a spatula to ensure good adhesive-fiber contact. After heating the impregnated fabrics to remove solvent, narrow strips of tape were cut from the fabrics and suspended in an air circulating oven. B-staging was accomplished by exposing the strips of tape to the following temperature-time cycle:

30 minutes at 150° F.
15 minutes at 200° F.
15 minutes at 250° F.
15 minutes at 280° F.
15 minutes at 310° F.

Portions of the B-staged tape exhibiting uniformity of color and cut to a width of 11/16 inch were selected for subsequent use in the metal bonding operation.

Prior to being bonded, each panel of stainless steel was thoroughly washed in an alkaline solution and rinsed in water. The panels were then degreased by contacting condensing trichloroethylene vapor for a period of 10 minutes. After rinsing with water and drying, the panels were immersed for 4 minutes in an acid bath consisting of 87 ml. of orthophosphoric acid (85%), 841 ml. of hydrochloric acid (38%) and 56 ml. of hydrofluoric acid (48%). The etched panels were then rinsed with water and dried with a hot air gun.

The etched panels were primed using the adhesive formulations as a paste. Equal amounts of the formulations were spread over the etched portion of the panels (about one inch) using a spatula. After drying the panels to remove solvent, the resultant primed surfaces were soft, glossy and quite uniform in appearance.

In the bonding operation, a primed panel was placed in a bonding jig. Adhesive tape, prepared as described above, was then applied over the primed area after which the tape was covered with a second panel so as to provide an overlap joint. The entire assembly was then placed between the platens of a hydraulically operated press. Before insertion the platens had been preheated to 500° F. The temperature controls for the platens were then shifted to 600° F. so as to provide a gradual increase in temperature. Contact pressure was alternately applied and released at 20 second intervals until the temperature reached 600° F. When this temperature was reached, a pressure of 55 p.s.i. was applied and held for 45 minutes. The platens were cooled to about 300° F. prior to removal of the bonding jig.

The bonded panels were next heated according to the following time-temperature cycle in order to postcure the adhesive compositions:

4 hours to 400° F.
4 hours to 600° F.
10 hours to 825° F.

The postcuring operation was carried out under a constant flow of nitrogen.

The bonded panels were tested at various temperature-time conditions. Aging of the specimens was carried out in a circulating air oven which maintained the temperature within plus or minus 5° F. Long time aging specimens were aged to within an hour or less of the total time required and then transferred to the test furnace for completion of aging prior to testing. In the testing, the tensile load was applied at a rate of 1200 to 1400 lbs./in.$^2$/min. as prescribed in Federal Specification MMM-A-132.

The test conditions and the results of the tests are shown below in Table II. Also included in the table are the results of tests made with stainless steel panels bonded with two commercial adhesives in accordance with the recommendations of the suppliers. The figures shown in the table are the averages of the values obtained in testing four different specimens under each of the indicated conditions.

TABLE II

| Exposure time and test temperature | Tensile shear strengths, p.s.i. | | | |
|---|---|---|---|---|
| | Composition [1] A | Composition [2] B | PBI [3] adhesive | PI [4] adhesive |
| Room temperature | 1,980 | 1,320 | 3,670 | 3,680 |
| ½ hour at 700° F | 1,860 | 1,230 | 2,600 | 1,090 |
| 75 hours at 700° F | 1,400 | 675 | 0 | 1,750 |
| ½ hour at 800° F | 1,840 | 1,210 | 1,900 | 500 |
| 4 hours at 800° F | 1,335 | 1,430 | 0 | |
| ½ hour at 900° F | 1,760 | 1,235 | 1,425 | 200 |
| 1 hour at 900° | 1,590 | 1,260 | 0 | |

[1] Adhesive composition of this invention.
[2] Adhesive composition containing AsAsS$_4$ in addition to other components of Composition A.
[3] Commercial polybenzimidazole adhesive.
[4] Commercial polyimide adhesive.

As seen from the data in the foregoing table, the stainless steel panels bonded with the adhesive composition of this invention exhibited outstanding retention of tensile lap shear strengths at elevated temperatures. For example, at 800° F. a 70 percent retention of room temperature properties was obtained. On the other hand the commercial adhesives tested provided bonds which had low strengths at elevated temperatures or failed altogether. The data also show that arsenic thioarsenate, a conventional antioxidant, has an adverse effect upon the strength property of the bonded panels.

While the adhesive composition has been described above with relation to the bonding of stainless steel panels, it can also be used to bond other metals such as titanium.

The adhesive composition is particularly useful for bonding structural components of advanced aircraft and weapons systems which require structural integrity when exposed to high temperatures. Adhesive bonding takes on added importance since it can replace conventional fasteners, such as rivets, nuts and bolts, thereby providing aerodynamically smooth surfaces and reducing stress concentration sites in structural components.

As will be evident to those skilled in the art, modifications of the invention can be made in view of the foregoing disclosure. Such modifications clearly fall within the spirit and scope of the invention.

We claim:
1. An adhesive composition consisting essentially of (1) a modified polybenzothiazole prepared by reacting a mixture of mixed toluidines and elemental sulfur in an inert atmosphere at a temperature ranging from about 250 to 450° F. for a period of about 12 to 20 hours, and adding 4-aminophthalimide to the reaction mixture prior to the end of the reaction period, the amounts of mixed toluidines and elemental sulfur being in the respective ranges of about 2 to 4 mols and about 8 to 15 gram atoms for each mol of 4-aminophthalimide, (2) 10 to 20 parts by weight of zinc oxide per 100 parts by weight of the modified polybenzothiazole; and 0 to 100 parts by weight of aluminum powder per 100 parts by weight of the modified polybenzothiazole.

2. The adhesive composition according to claim 1 in which the modified polybenzothiazole is in solution in an aprotic solvent and the zinc oxide and aluminum powder are in suspension in the solution.

3. The adhesive composition according to claim 2 in which the aprotic solvent is dimethylformamide.

References Cited
UNITED STATES PATENTS

| | | | |
|---|---|---|---|
| 3,047,543 | 7/1962 | Morton et al. | 260—79 |
| 3,260,700 | 7/1966 | Rudner et al. | 260—304 X |
| 3,267,081 | 8/1966 | Rudner et al. | 260—304 X |
| 3,448,080 | 6/1969 | Hirsch | 260—79 X |
| 3,539,523 | 11/1970 | Duany | 260—32.6 N X |
| 3,560,438 | 2/1971 | Burton et al. | 260—79 X S |
| 3,598,768 | 8/1971 | Bach | 260—79 X |
| 3,729,453 | 4/1973 | Zellner et al. | 260—32.6 N X |
| 3,737,478 | 6/1973 | Boldebuck | 260—78 A X |
| 3,772,309 | 11/1973 | Marvel et al. | 260—304 X |

ALLAN LIEBERMAN, Primary Examiner

T. DEBENEDICTIS, SR., Assistant Examiner

U.S. Cl. X.R.

260—32.6 N, 37 N, 78 A, 79, 88.3 R, 304